(Model.)

4 Sheets—Sheet 1.

H. McDONALD & R. A. CARTER.
MACHINE FOR MAKING NUTS AND BOLTS.

No. 268,037.

Patented Nov. 28, 1882.

Witnesses
R. C. Wrmshull
Jno. K. Smith

Inventors
Hugh McDonald
Robert A. Carter
By Attorneys
Bakewell & Kerr.

(Model.) 4 Sheets—Sheet 3.

H. McDONALD & R. A. CARTER.
MACHINE FOR MAKING NUTS AND BOLTS.

No. 268,037. Patented Nov. 28, 1882.

(Model.)  
4 Sheets—Sheet 4.

H. McDONALD & R. A. CARTER.
MACHINE FOR MAKING NUTS AND BOLTS.

No. 268,037.  
Patented Nov. 28, 1882.

Witnesses  
R. C. Wonshull  
Jno. K. Smith

Inventors  
Hugh McDonald  
Robert A. Carter  
By Attorneys  
Bakewell & Kerr

UNITED STATES PATENT OFFICE.

HUGH McDONALD, OF ALLEGHENY, AND ROBERT A. CARTER, OF PITTSBURG, PENNSYLVANIA.

MACHINE FOR MAKING NUTS AND BOLTS.

SPECIFICATION forming part of Letters Patent No. 268,037, dated November 28, 1882.

Application filed December 8, 1880. (Model.)

*To all whom it may concern:*

Be it known that we, HUGH McDONALD, of Allegheny, and ROBERT A. CARTER, of Pittsburg, both in the county of Allegheny and State of Pennsylvania, have invented a new and useful Improvement in Nut and Bolt Machines; and we do hereby declare the following to be a full, clear, and exact description thereof, reference being had to the accompanying drawings, forming part of this specification, in which—

Figure 1:
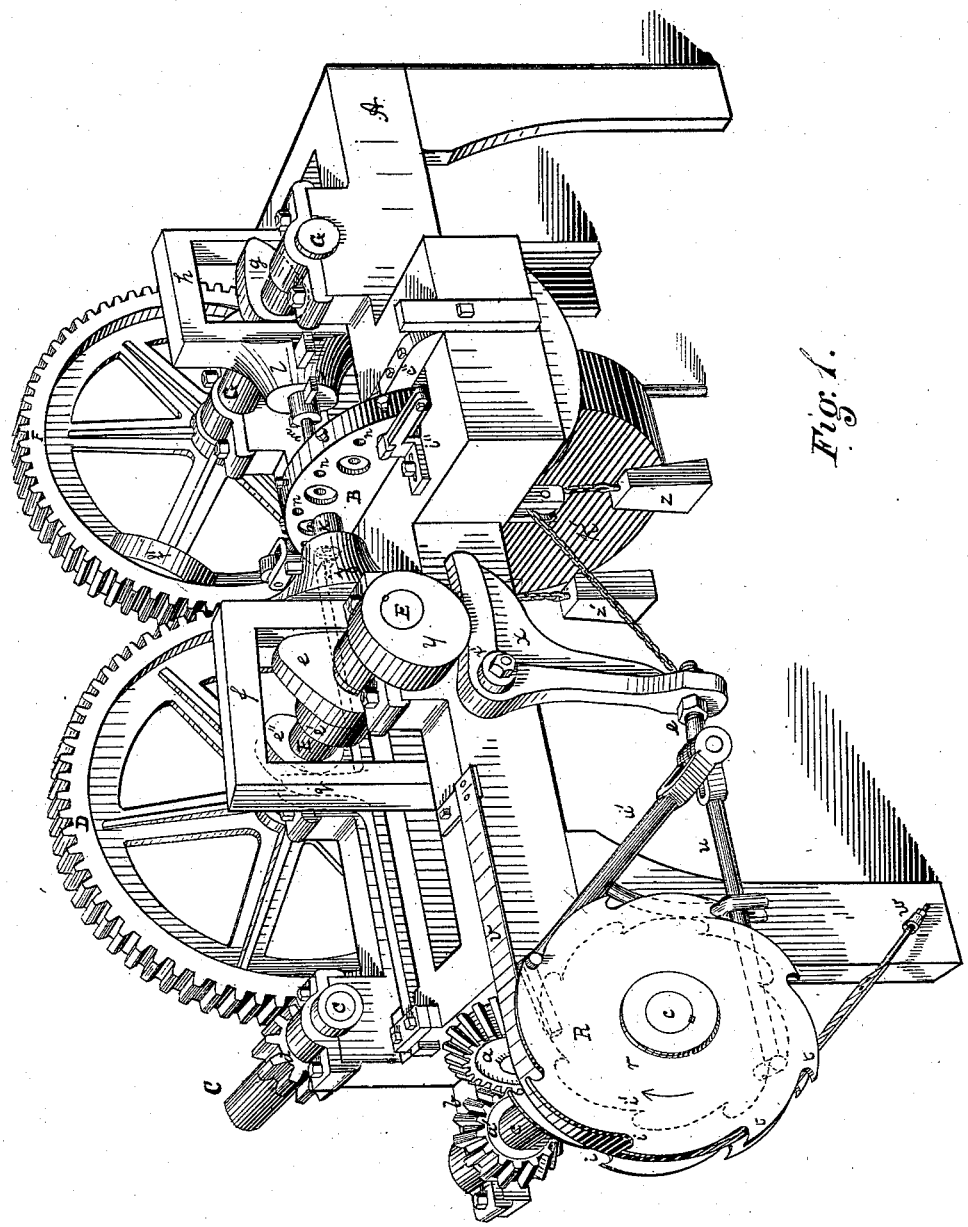
Figure 2:
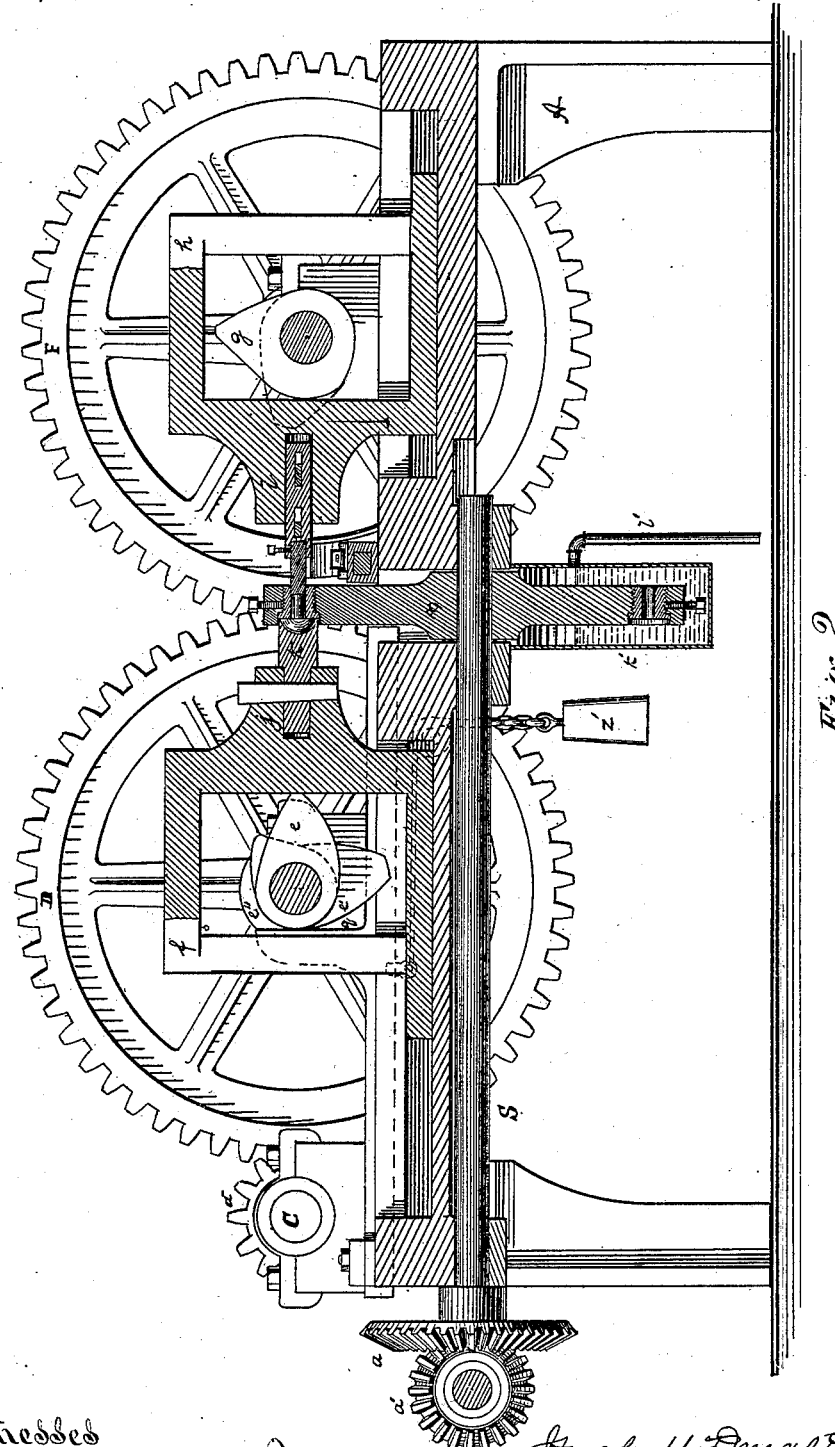
Figure 3:
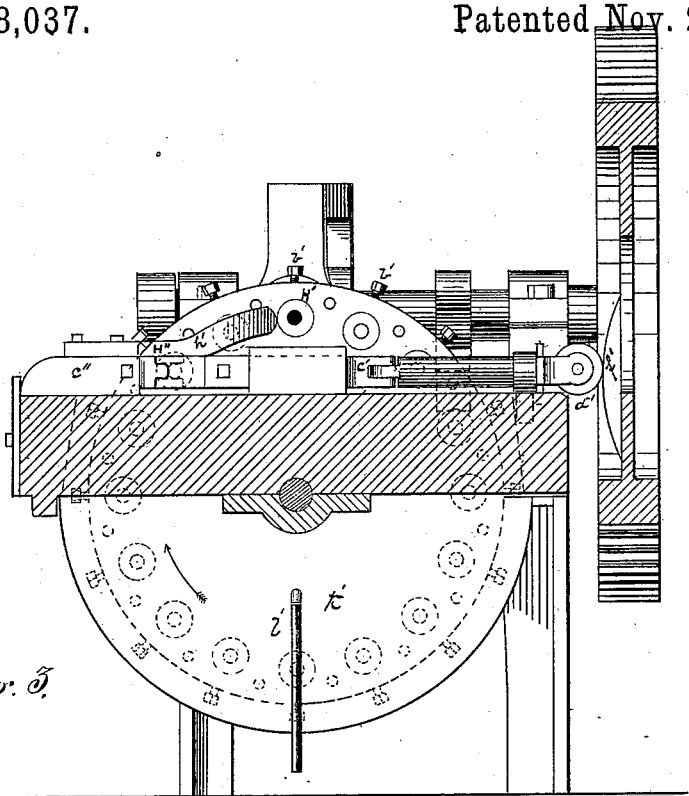
Figure 4:
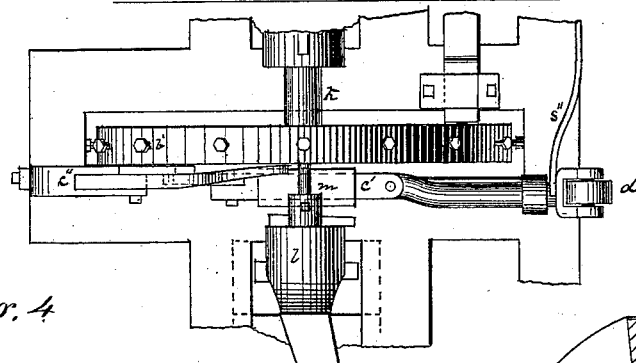
Figure 5:
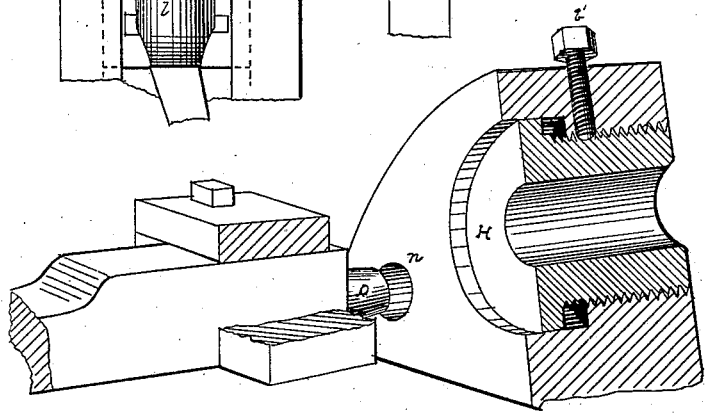
Figures 9, 10:
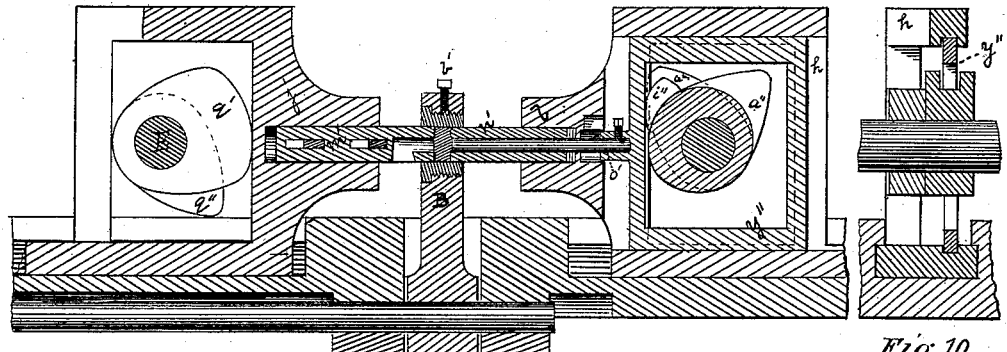
Figures 7, 8, 11:
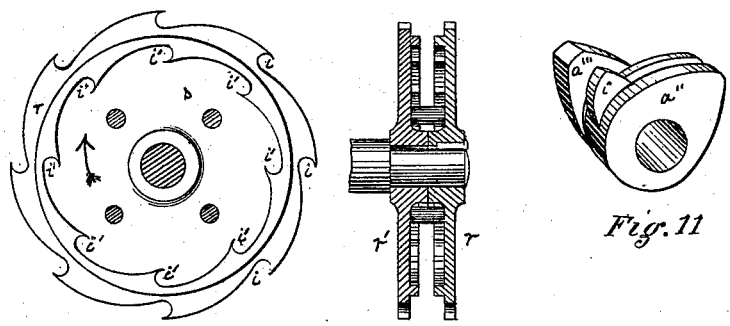
Figure 6:
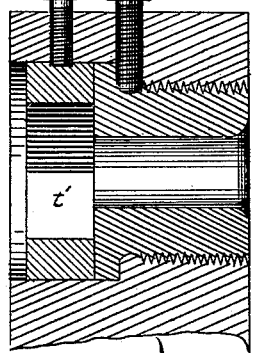
Figure 12:
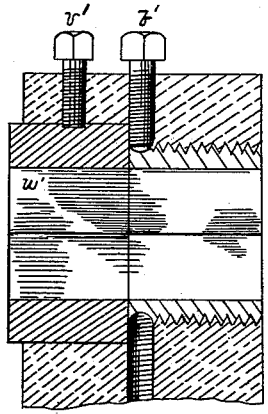

Figure 1 is a perspective representation of our machine. Fig. 2 is a side and partly-sectional elevation thereof. Fig. 3 is a side view of the revolving die-holder and its connections. Fig. 4 is a top or plan view of the same. Fig. 5 is a perspective and partly-sectional view of a part of the revolving die-holder drawn to a larger scale, and exhibiting the manner in which the dies are inserted and secured and the means adopted for securing due registration of the die-holder. Fig. 6 is a section through the upper part of the revolving die-holder, with a box or frame inserted for making angular-headed bolts. Fig. 7 is a side view of one of the disks composing the ratchet-wheel. Fig. 8 is a section through the axis of the ratchet-wheel. Fig. 9 is a longitudinal sectional elevation of a portion of the machine, showing the operative parts arranged for making nuts. Fig. 10 is a transverse vertical section through *x x*, Fig. 9. Fig. 11 is a perspective representation of the cam used in the machine when arranged for making nuts; and Fig. 12 is a section similar to Fig. 6, but having a box inserted in the die-holder for making hot-pressed nuts.

Like letters in the several figures denote the same parts.

Our machine belongs to that kind of bolt, rivet, and nut machines in which the dies are set in a revolving die-holder—a class of machine which, while it possesses several well-recognized advantages, yet has not hitherto been practically successful, owing chiefly to the want of perfect registration between the dies and the feeding and heading devices in bolt and rivet machines and of the nut-box and punches or dies in nut-machines, and also to a lack of fixity and steadiness of the die-holder during the operation of the heading or punching and pressing.

Our invention is specially addressed to the correction of these defects, and to the construction of a simple and efficient machine, which, by a mere change of dies or punches and change and adjustment of cams, shall be adapted to the making of rivets and bolts of various lengths and different kinds of heads, and also to the manufacture of hot-pressed nuts and washers of different sizes.

In the drawings, Figs. 1 and 2, A is the frame of the machine, consisting of a bed and suitable legs or supports.

B is the revolving die-holder, which is a circular disk of sufficient thickness to receive and securely hold the dies, which are set at uniform distances apart in suitable cavities in the die-holder. This disk is rigidly attached, by keys or otherwise, to the die-shaft S, which extends horizontally from the die-holder B to the front end of the machine, and on its front extremity, outside the frame of the machine, is keyed a beveled-gear wheel, *a*, which meshes into another beveled-gear wheel, *a'*. The gear-wheel *a* is preferably of larger diameter than the wheel *a'*, and the latter is keyed to a short transverse horizontal shaft, *c*, which is supported in bearings in two brackets projecting from each side of the machine, at the front end thereof. One of these brackets, *b*, is shown in the drawings, Fig. 1. The other is concealed by the ratchet-wheel R.

At one extremity of the short shaft *c*, and outside of the frame A, is keyed the ratchet-wheel R, which consists of two parallel circular disks, *r r'*. The peculiar construction of these disks is shown in Figs. 7 and 8. As these disks are exactly alike in all respects, excepting that the inner ratchet-teeth are on one side or face of one disk, *r*, and on the other side or face of the other disk, *r'*, it will suffice to describe one of them. The outer edge or periphery of each disk has semicircular notches *i*— say eight in number, but may be more or less, as required—at uniform distances apart, and the outline of the circumferential line extends by a curved line from the inner edge of each notch to the outer edge of the next succeeding notch, thus forming a series of ratchet-teeth, *t t*, &c., of long pitch.

On the inner face of the disk, and either securely fastened thereto or made in one piece therewith, is an annular ratchet-plate, *s*, which is concentric with its disk *r*. The outer periphery of this annulus is a circular plane surface, while the inner periphery has notches $i'$, similar to and corresponding in radial position with the notches $i$ in the disk $r$, and the outline between these notches $i'$ is also a curved line from the top of one notch to the bottom of the next one. As will be seen by reference to the drawings, Fig. 7, the ratchet-teeth in the disk $r$ point in the direction of revolution of the disk, as indicated by the arrow on Figs. 1 and 7, while the ratchet-teeth in the annulus $s$ point in the opposite direction. These two disks are keyed to the shaft with their ratchet-annuli $s\ s'$ facing each other, but not touching, (see Fig. 8,) so that a space is left between them, into which the pawl-arm $u$ enters, so as to reach the notches and engage the ratchet-teeth of the ratchet-annuli $s\ s'$, as shown by dotted lines in Fig. 1.

A brake band or strap, $v$, of leather, steel, or other suitable material, is attached at one end to the frame of the machine, and is passed over the ratchet-wheel R, resting between the disks $r\ r'$ on the outer plane surfaces of the annuli $s\ s'$, and terminates in a screw-bolt, which, passing through an eye on the frame of the machine, is secured and tightened by a nut, as shown at $w$, Fig. 1. By means of this brake the motion of the ratchet-wheel R is steadied and any ill effects which might result from the momentum of the wheel are obviated. It will be noticed the motion of the ratchet is not constant but intermittent, as it is operated by a cam, $y$, and has no direct gearing-connection with the prime-motor shaft C. The shaft C is connected with the engine or other source of power, and its pinion $d$ gears into the cog-wheel D, keyed to the cam-shaft E. The cog-wheel D gears into another cog-wheel, F, of the same diameter, which is keyed to the cam-shaft G. The forward cam-shaft, E, operates the front dies or punches, and the rear cam-shaft, G, operates the back dies or punches. The cam-shafts E and G are placed horizontally at right angles to the die-shaft S, as shown in Fig. 1.

At one extremity of the cam-shaft E is keyed the cam $y$, which operates the bell-crank lever $x$, which turns on a pivot at $x'$. The cam $y$ works on the short arm of the lever $x$, which is pressed up against its cam by a chain and weight, $z$, connected with the extremity of the long arm of the lever. If desired, a spring may be used instead of a weight, the spring bearing against the under side of the short arm or against one side of the long arm of the lever.

To the extremity of the long arm of lever $x$ are pivoted (by means of a hinge-bolt, $e$, or similar device) the rear ends of two pawl-arms, $u\ u'$, one of which, $u$, enters the space in the ratchet-wheel R between the annuli $s\ s'$, and acts upon the ratchet-teeth of the annuli, while the other pawl-arm, $u'$, acts upon the teeth in the periphery of the ratchet-disks $r\ r'$. Each pawl-arm $u\ u'$ has a T-head at its forward extremity, so as to engage the two opposite or parallel teeth at the same time, and the locking-pawl $u'$ has a forked arm, $u^2$, which rests upon the feeding-pawl $u$ and causes the lift or rise of the locking-pawl during the recession or fleeting of the feed-pawl. A similar result may be obtained by uniting the two pawls where they are pivoted to the bell-crank or rocking lever $x$, though there is a material advantage in the construction shown, as the locking-pawl can act independently of the feed-pawl, as well as rise and fall in unison therewith. It results from this construction that when the short arm of the lever $x$ is depressed by its cam $y$ the lower pawl-arm, $u$, receives a forward motion in the direction of the arrow in Fig. 1, and as its T-head is engaged in a pair of notches in the annuli $s\ s'$ it causes the ratchet-wheel R to make a partial revolution in the direction of the arrow, the length of stroke of the long arm of lever $x$ being such that the pawl $u$ will move the wheel R the distance between two sets of ratchet-teeth. While this movement is taking place the T-head of the upper pawl, $u'$, is resting on the circumference of the two disks $r\ r'$, and engages a pair of ratchet-teeth as the stroke of the lower pawl-arm terminates. The purpose of this movement is to secure an exact motion of the revolving die-holder B, so that at the end of the stroke of the pawl-arms $u\ u'$ the cavity of one of the dies in the die-holder may exactly register with the dies or punches which are to enter the die. This precision of motion is essentially necessary in making nuts, and is very important when the machine is used to make headed articles—such as rivets or bolts—as otherwise the head would not be formed exactly centrally with the shank. As soon as this result is secured and the cam $y$ ceases to act on the lever $x$ the weight $z$ draws back the pawl-arms $u\ u'$, the lower pawl-arm, $u$, receding, so as to engage another pair of teeth, and the upper one rising over the teeth with which it had been engaged.

On the forward cam-shaft, E, are keyed the cams $e$ and $e'$, which are surrounded by the yoke $f$. The cams $e$ and $e'$ are placed side by side and the yoke $f$ is set askew, so that the cam $e'$ operates against the rear face of the cam-yoke, but not against the front face, while the cam $e$, on the other hand, operates against the forward but not against the rear face of the yoke. These cams $e$ and $e'$ are set so as to operate the yoke $f$ at the proper time, and so, also, that one of the cams is always bearing against the yoke, so as to prevent as far as possible any lost motion or looseness. At the end of the yoke $f$ is attached the cam-head $j$, in the cavity of which is the header $k$, (or top die if the machine is used for making nuts.)

In further describing the machine we shall first describe it as arranged for making bolts or rivets, as shown in Fig. 1, and afterward explain the interchangeable devices inserted to adapt it to the making of nuts. (Shown in Fig. 9.)

On the rear cam-shaft, G, are keyed the cams $g\ g'$, which are so set as to operate the mandrel m of the bolt-machine at the proper time. The cam-yoke, in which the cams g g' operate, is also set askew on its slide, like the cam-yoke f, and for the same purpose. Although these cam-yokes f and h are set obliquely, yet their slides are at right angles to their shafts, so that their motion is not oblique, but exactly in the same right line, and the header and mandrel are so set in their die-heads that their axes and paths of motion are exactly opposite to each other and coincident. The arrangement of the cams, cam-yokes, and their slides is shown more clearly in Fig. 2. At the front end of a cam-yoke, h, is the cam-head l, in the cavity of which is keyed the mandrel m. The header and mandrel held and operated by the cam-yokes are capable of adjustment in the line of their axes, so as to be made to project more or less, according to the length of shank or thickness of head of the bolt or rivet to be made therewith. This adjustment may be effected by means of set-screws.

The revolving die-holder B has a series of holes, n n, &c., in its front face, near the periphery, which correspond in number with and are located between the cavities for the dies. These holes n are designed to receive the end of a bolt, o, an enlarged view of which is given in Fig. 5. The bolt o works in a slide in the frame of the machine, and is pressed up against the front face of the revolving die-holder B by a weight, z', (see Fig. 2,) so that whenever the die-holder arrives at the exact point in its revolution where the axis of the dies coincides with the axis of the header and mandrel the bolt o enters one of the holes n and retains the die-holder in its position. The bolt o had better be slightly tapering and the outer edges of the holes rounded, so that the bolt o may enter easily and without friction. By this means a bolt fitting exactly into its hole, so as to allow of no motion of the die-holder, will readily enter each hole as it comes in line with the bolt, and in case of a slight variation of registration between the cavity of the die and the tool which is to work in it the tapering bolt will enter its hole n, and on advancing farther will move the die-holder sufficiently to bring it to its exact position. At the time when the revolving die-holder B is required to make a partial revolution on its axis the bolt o is retracted by means of a cam, e'', keyed onto the shaft E. This cam does not work in the yoke f, but against a bracket, q, which projects vertically from the slide of the holding-bolt o. This bracket is shown in dotted lines in Fig. 1.

The cavities in the revolving die-holder in which the dies H are set are cylindrical. The diameter of these cavities, which extend through the die-holder B, is larger at the front side for about one-third (more or less) of the thickness of the die-holder, and the rear portion of these cavities has a screw-thread, forming a female screw, (see Figs. 5 and 6,) into which the die is screwed to a greater or less depth, as may be desired. A set-screw, b', in the periphery of the die-holder B is screwed down onto each die and holds it securely in the desired position. It will be seen that by this arrangement a cylindrical cavity is formed at the front end of each die in the die-holder, of greater or less depth, according as the die is entered to a greater or less depth in the cavity of the die-holder.

The dies H (designed for making bolts or rivets) have a central bore of cylindrical, square, or other shape, as may be desired, or partly angular and partly cylindrical, according to the desired shape of the shank or shank and neck of the bolt or rivet. The header k, by which the head of the bolt or rivet is made by a longitudinal thrust, may have a cup-shaped cavity of any desired conformation, or may have a plane face. If it is desired to compress the head of the bolt in a cavity, a suitable frame, or box, t', (see Fig. 6,) is inserted in the cylindrical cavity of the die-holder, in front of the die H, which may be secured in place by a set-screw, v', or otherwise. The rear end of the cavity of the die H is rounded, as shown, so that the rod from which the rivet or bolt is to be made may be easily introduced into the die. As, therefore, the edge of the die H around the cavity, at the rear end, is not angular, it cannot be used as a part of the cutting device to sever the blank from the rod. We therefore use a pair of cutters for this purpose, which are shown on an enlarged scale in Figs. 3 and 4. These cutters c' c'' are placed near and parallel to the rear face of the revolving die-holder B, one, c'', being stationary and the other, c', movable. The movable cutter has a roller, d', at its outer extremity, against which a cam, f', (fixed to the side of the cog-wheel F of the rear cam-shaft,) presses on every revolution of the wheel F, causing it to advance and sever a blank from the rod. As soon as the blank is severed the cam f' passes away from the roller d', and a spring, s'', immediately retracts the movable cutter c', so as to leave the path clear for the introduction of another blank into the next succeeding die H. It will be seen by Fig. 3 that the cutters are not placed so as to operate in the line of the die H', which is in line with the die-punch and header, but in the line of the second die from the die H', so that the cutters are not in the way of the punch and header and do not interfere with their operation.

At the front of the revolving die-holder B is an adjustable gage, i', which is so placed on the frame of the machine that the die H'', into which the rod is fed, will be exactly in line with the gage at the time when the rod is fed in. The rod is pushed into the cavity of the die until it comes in contact with the gage i'', before it is severed by the cutters c' c''. As the size of the head of the bolt or rivet will depend on the amount of iron projecting beyond the face of the die H'', the gage is slid to or from the face of the die-holder to give more or less projection to the blank, as may be desired. When the blank has been severed from the rod a small portion is left projecting outside the rear end of the die. As the die-holder moves round the blank passes under a spring-finger, $h'$, the end of which presses against the rear face of the die-holder B, and is thereby pushed fully into the cavity of the die in which it is entered. The rod from which the blank is to be severed is fed into one of the dies, H'', from the rear end of the machine, while the revolving die-holder B is stationary. The die-holder then makes a partial revolution equal to the distance between two dies, and then the blank is pushed into its die, the die-holder again coming to rest, when another blank is fed into a second die. The die-holder then starts and makes another partial revolution and comes to rest, when the rear cam-yoke advances and the mandrel $m$ pushes the first blank farther into its cavity, so that the forward end of the blank projects from the front of the die sufficiently for the formation of the head. The mandrel $m$ then remaining stationary, the header $k$ advances and compresses the projecting end of the blank to form a head. The header then retires and the mandrel $m$ advances and pushes the finished bolt or rivet out of the die. The mandrel $m$ then retires, and the parts are in position to repeat the operation. Thus at every revolution of the machine three operations are simultaneously performed in three separate dies. In one die a blank is entered and severed from its rod. At the next die a blank is pushed farther in by the spring-finger, while at the third die the blank is headed and delivered as a finished bolt or rivet from the machine.

The rod from which the bolts or rivets are made is fed into the machine at a welding-heat; and in order to prevent any injury to the dies by overheating, a water-jacket, $k'$, (see Figs. 2 and 3,) surrounds the lower part of the die-holder B, which is supplied with water by a pipe, $l'$. This jacket may not always be found necessary, and may be dispensed with where the articles to be made are small.

We have described the ratchet-wheel R as made of two similar disks, differing only in having the annuli with the inner set of notches on opposite sides of the disks. This arrangement secures great steadiness and accuracy of motion. A single ratchet-disk may, however, be employed, in which case the T-heads on the pawls will be dispensed with, and rods or strips may be placed on the same side of the single ratchet-disk as the annulus, if necessary, to keep the lower pawl from slipping to one side.

If it is desired to make a bolt having a round shank or square neck and a compressed angular head, the die is made with a cavity partly cylindrical and partly angular, and is screwed down into the cavity of the die-holder, so as to permit of the insertion into the cavity of the die-holder of a steel or cast-iron frame or box, $t'$, having a cavity of the required shape for the head of the bolt. In this case the header may be of such diameter and shape as to slightly enter this frame or box. This arrangement is shown in Fig. 6. The head-box $t'$ is secured in its place in the die-holder by a set-screw, $v'$.

We have described our machine as constructed and arranged for the manufacture of rivets and bolts. We will now proceed to explain the devices which we use to adapt it to the making of hot-pressed nuts or washers. In this case, instead of the dies H, nut-boxes $w'$, of steel or chilled cast-iron, are inserted into the cylindrical cavities of the revolving die-holder. These nut-boxes are externally cylindrical, and have a cavity either cylindrical, square, hexagonal, or other desired shape, and are held in place by set-screws $v'$. (See Fig. 12.) If preferred, these nut-boxes, being externally cylindrical, may have a screw-thread or other outer surface, and be screwed into the cavities of the die-holder, and be further held in place by set-screw $b'$, like the dies H in Fig. 6. In place of the header $k$, a punch, $m'$, of suitable shape in cross-section and suitable size to fit the cavity of the nut-boxes, is set in the cam-head $j$, and a similarly-shaped back punch, $n'$, is set in the cam-head $l$. (See Fig. 9.) These punches have a cylindrical cavity for the round eye-punch $o'$ to work in.

As the eye-punch $o'$ is required to have motion independent of the back square punch, $n'$, through which it works, we insert within the rear cam-yoke, $h$, an inner cam-yoke, $y''$, to which the punch $o'$ is attached. (See Fig. 9.) This inner cam-yoke, $y''$, slides in grooves in the cam-yoke $h$, (see Fig. 10,) and in place of the rear cams, $g$ $g'$, used for the bolt-machine, (see Fig. 1,) we substitute two cams, $a^2$ $a^3$, which work in and operate the outer yoke, $h$, the cam $a^2$ operating to cause it to advance and the cam $a^3$ operating to cause it to recede, the cam-yoke $h$ being askew, as before described. The cam $a^3$ is bifurcated, so that it may pass on both sides of the inner cam-yoke, $y''$, and operate the cam-yoke $h$ without acting on the inner yoke, $y''$; and between the bifurcations of the cam $a^3$ is placed a projection or third cam, $i''$, which acts upon the inner cam-yoke, $y''$, and thus operates the eye-punch $o'$. These cams $a'$ $a''$, with the projection or third cam, $i''$, are keyed to the shaft G in place of the cams $g$ $g'$ of the bolt-machine. A similar change of cams is made in the front shaft, E, the cams $q'$ $q''$ (see Fig. 9) being substituted for the cams $e$ $e'$, to operate the cam-yoke $f$ and give the proper motion to the square punch $m'$ of the nut-machine. The cam $e''$ operates the bolt $o$ to keep the revolving die-holder in position. The nut-bar may be fed into the machine from the side or lengthwise, as may be preferred, according as the nuts are to be cut with or across the grain of the iron. If fed in at the side, the cutters $c$ $c''$ and finger $h'$ will not be used, as the nut-blank will be cut from the bar by the rear square punch, $n'$; but if fed in lengthwise the blanks will be severed from the bar by the cutters and pushed into the nut-boxes by the finger $h'$, in like manner as before described in case of the bolt-blanks.

The above-described arrangement of the parts for the nut-machine is shown in Fig. 9, and its operation is as follows: The nut-bar, being first heated, is fed into the machine from one side against the rear face of the revolving die-holder, which is then at rest. The back punch, n', then advances, cutting a nut-blank from the nut-bar and forcing it into the cavity of the nut-box. The front punch, m', then advances, enters the nut-box w', and compresses the blank in the nut-box against the end of the back punch, n'. The parts then occupy the relative position shown in Fig. 9. The square punches m' and n' then remaining stationary, the eye-punch o'' advances and punches out a wad, forming the eye of the nut. The eye-punch o'' then remaining stationary, the forward punch, m', recedes and the back punch, n', simultaneously advances through the cavity of the die-box and strips the nut off the eye-punch. The forward punch then travels farther back and the finished nut drops down from the machine. The back punch and eye-punch then recede together and the parts assume their first position, ready for a repetition of the operation.

We have described a relative order of operation of the parts which we deem desirable; but it is obvious that by adjustment of the cams the order of operation may be changed—as, for instance, so as to punch the nut before it is compressed and while held between the two dies, and then compress it around the eye-punch by a slight advance of either or both of the punches. As just described, the nut-blank will be severed from the bar by the back punch, and the cutters used in the bolt-machine will not then be necessary. In such case the fiber of the iron will run at right angles to the axis of the eye of the nut. If it is desired to have the nut made with the fiber of the iron running parallel to the axis of the eye, the nut-bar may be fed in from the end of the machine, the nut-blank severed by the cutters c' c'', pushed farther into the nut-box by the spring-finger h', and then pressed and punched, as before described.

We are aware that an intermittent rotary feed motion has heretofore been obtained by means of two ratchet-disks arranged side by side and having reversely-arranged teeth, said disks being rotated by a pivoted pawl and locked by a rigid pin or spring-stop on the lever which actuated the feed-pawl, and do not herein claim such devices or combination of devices; but,

Having thus described our improved machine, what we claim as our invention, and desire to secure by Letters Patent, is—

1. In machines for making bolts or nuts, having a revolving-die holder in which the dies are arranged circumferentially at uniform intervals, the combination of a ratchet wheel furnished with two sets of ratchet-teeth in reverse directions, a feed-pawl and a locking-pawl pivoted together and attached to a lever, by which the feed-motion is effected, and a weight or weights by which both pawls are held in a locked position in relation to the ratchet-wheel for the purpose of communicating an intermittent motion of rotation to the die-holder and of holding it firmly in the exact desired position during each intermission of rotation, substantially as described.

2. In a machine for making bolts or nuts, having a revolving die-holder, the combination of a pivoted or rocking lever, a cam operating against one arm of such lever, a ratchet-wheel having two series of teeth reversely arranged, a feed and locking device consisting of two pawls pivoted together and connected with said lever, so as to operate in unison therewith, and a weight or weights to retain the pawls in a locked position when the lever is at rest, substantially as described.

3. The combination of the ratchet-wheel R, pawls u u', lever x, cam y, weight z, and brake-strap v, substantially as and for the purpose described.

4. The combination of the revolving die-holder B, having a uniform intermittent partial revolution, with the cam-yokes f and h, cams e, e', and e'', and cams g g', with their shafts, substantially as and for the purpose described.

5. The combination of the revolving die-holder B, having an intermittent rotary motion, with the shaft G, wheel F, and its cam f', with the cutters c' c'', substantially as and for the purpose described.

6. The combination of a die-carrier having a cylindrical threaded die-cavity of greater diameter at the front than at the rear, with a cylindrical threaded die having a flange or shoulder at its front end, corresponding with the anterior diameter of the die-cavity, substantially as and for the purposes described.

7. In combination with a revolving die-holder, a double ratchet-wheel composed of two disks arranged side by side, and having notches upon their peripheries inclined in the same direction, and a corresponding series of notches upon the sides of the disks, said notches inclined in the reverse direction to those on the peripheries of the disks, a brake-band for steadying the ratchet-wheel, and a feed-pawl and locking-pawl for imparting a uniform intermittent motion to the ratchet-wheel, substantially as and for the purpose specified.

8. The machine, comprehending a rotatable die-carrier, having a series of die-cavities adapted to receive the interchangeable nut and bolt dies, cam-yokes provided with heads adapted to receive interchangeable nut and bolt tools, as described, and shafts E and G, jointly with the interchangeable cams and supplemental cam-yoke, all combined and arranged substantially as and for the purpose specified.

In testimony whereof we have hereunto set our hands.

HUGH McDONALD.
ROBERT A. CARTER.

Witnesses:
JAMES H. PORTE,
T. B. KERR.